(12) United States Patent
Terada et al.

(10) Patent No.: US 7,519,243 B2
(45) Date of Patent: Apr. 14, 2009

(54) SUBSTRATE, SUBSTRATE ADAPTED FOR INTERCONNECTING OPTICAL ELEMENTS AND OPTICAL MODULE

(75) Inventors: Koji Terada, Kawasaki (JP); Jun Matsui, Kawasaki (JP); Hiroyuki Nobuhara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 184 days.

(21) Appl. No.: 11/017,811

(22) Filed: Dec. 22, 2004

(65) Prior Publication Data

US 2006/0028926 A1 Feb. 9, 2006

(30) Foreign Application Priority Data

Aug. 4, 2004 (JP) ............................. 2004-228440

(51) Int. Cl.
*G02B 6/12* (2006.01)
(52) U.S. Cl. .......................... 385/14; 385/129
(58) Field of Classification Search ................. 385/14, 385/129
See application file for complete search history.

(56) References Cited

U.S. PATENT DOCUMENTS

| | | | |
|---|---|---|---|
| 5,625,734 A * | 4/1997 | Thomas et al. ............. 385/88 |
| 5,768,456 A * | 6/1998 | Knapp et al. ............... 385/49 |
| 5,790,733 A | 8/1998 | Smith et al. |
| 6,492,698 B2 * | 12/2002 | Kim et al. ................. 257/432 |
| 6,915,049 B2 | 7/2005 | Murata |
| 6,939,058 B2 * | 9/2005 | Gurevich et al. ........... 385/93 |
| 7,004,644 B1 | 2/2006 | Johnson |
| 7,070,339 B2 | 7/2006 | Nagasaka et al. |
| 7,104,703 B2 | 9/2006 | Nagasaka et al. |
| 7,257,297 B2 | 8/2007 | Kondo |
| 2002/0118924 A1 | 8/2002 | Murata |
| 2004/0022487 A1 * | 2/2004 | Nagasaka et al. ........... 385/31 |
| 2004/0028349 A1 | 2/2004 | Nagasaka et al. |
| 2004/0033029 A1 | 2/2004 | Kondo et al. |
| 2004/0252951 A1 | 12/2004 | Nagasaka et al. |

FOREIGN PATENT DOCUMENTS

JP 2196476(A) 8/1990

(Continued)

OTHER PUBLICATIONS

Japanese Official Action dated Oct. 28, 2008 with English Translation in corresponding JP2004-228440.

*Primary Examiner*—Jennifer Doan
(74) *Attorney, Agent, or Firm*—Hanify & King, P.C.

(57) ABSTRACT

The present invention provides substrate 10, capable of transmitting lights in thickness direction for enhancing usefulness of the substrate. Its object is to provide a substrate adapted for interconnecting optical elements, allowing reduction of number of components leading to miniaturization and low cost, and high-efficient and stable optical coupling leading to low electric power dissipation. To accomplish the object the substrate comprises substrate body, wherein it is comprised of electric wiring layer disposed on first substrate body surface in such a manner as to be capable of electrically connecting first optical element mounted on the side of first substrate body surface; and optical transmission path, propagating lights being transmitted and received between first optical element electrically connected at electric wiring layer and second optical element disposed on the side of second substrate body surface different from first substrate body surface in substrate body.

18 Claims, 12 Drawing Sheets

FOREIGN PATENT DOCUMENTS

| | | |
|---|---|---|
| JP | 4241477(A) | 8/1992 |
| JP | 4-329699 | 11/1992 |
| JP | 9-270747 | 10/1997 |
| JP | 11-233911 | 8/1999 |
| JP | 2000-82830 | 3/2000 |
| JP | 2000/512029 | 9/2000 |
| JP | 2002-98842 | 5/2002 |
| JP | 2002-250846 | 9/2002 |
| JP | 2003-503858 | 1/2003 |
| JP | 2004-021034 | 1/2004 |
| JP | 2004-086136 | 3/2004 |
| JP | 2004-086137 | 3/2004 |
| JP | 2004-086157 | 3/2004 |

\* cited by examiner

SUBSTRATE, SUBSTRATE ADAPTED FOR INTERCONNECTING OPTICAL ELEMENTS AND OPTICAL MODULE

BACKGROUND OF THE INVENTION

1) Field of the Invention

The present invention relates to a substrate, more specifically to a substrate adapted for interconnecting optical elements, which is suitably applicable for carrying out optical coupling between optical elements, and furthermore specifically to a substrate adapted for interconnecting optical elements as well as optical module, which are suitably applicable for data transmission system.

2) Description of the Related Art

In the data transfer system today, for example, in a server system, while data processing is being carried out by use of an electric signal, data transfer proceeds by use of an optical signal. In the data transfer using the optical signal in such a server system, optical modules are in use. An optical module is an arrangement, which allows a photoelectric converter and an optical element for propagating the optical signal, e.g., an optical fiber to be connected and optically coupled.

Specifically, by connecting a photoelectric converter, which converts the electric signal into the optical signal, and an optical fiber, there can be configured a transmission module, which transmits the optical signal converted by the photoelectric converter through the optical fiber, while by connecting the photoelectric converter, which converts the optical signal into the electric signal, and the optical fiber, there can be configured a reception module, which converts the optical signal transmitted through the optical fiber into the electric signal by the photoelectric converter.

In the advanced server system today, the parallel transfer of an optical signal on a large scale is based upon the premise that multiple optical modules are mounted in parallel, so that small-type, low manufacturing cost and low dissipation power are demanded of each optical module to be applied to such a system.

In order to develop a small, low-cost optical module, it is important to reduce the number of components constituting the module, and in order to develop a low-dissipation power optical module, it is important to achieve an efficient and stable optical coupling in both transmission modules and reception modules, so as to minimize optical transmission power to the extent of communicability.

In the optical module for communications developed so far, in view of the need for long-distance transmission the design has been carried out with consideration as to how efficiently the optical element and optical fiber are coupled, thus a number of lens couplings of high-cost and yet high-coupling-efficiency have been largely employed.

As for a technique to connect and secure the optical element using the above mentioned lens coupling, for example, optical module 100 of can package type, can be cited, which is shown in FIG. 23. The optical module 100 shown in FIG. 23 is provided with an optical element 101, two pieces of lenses 102 and 103, a ferrule 104, a cap with a window 105, a stem 106 and a flexible circuit board 107. That is to say, as components for connecting and securing the optical element 101 and ferrule 104 there are provided two pieces of lenses 102 and 103, a cap with a window 105, a stem 106 and a flexible circuit board 107.

Another example is described in the Patent Document 1 described below. In the patent document 1, as shown in FIG. 24, a description is given about an optical sub-assembly 110, which is provided with a flexible circuit 116, a photoelectric element 118, a spacer 114, a micro-lens eye 136 and an optical member 112 for supporting the micro-lens eye 136, wherein the reduction of manufacturing cost is sought by employing molded components. Additionally, in FIG. 24, as components for connecting and securing the photoelectric converter 118 and an optical fiber block 123, the flexible circuit 116, spacer 114, micro-lens eye 136 and optical member 112 are provided.

Other well known techniques in the art related to the present invention are, for example, those described in Patent Documents 2 to 5 as follows:

(Patent Document 1) Japanese Patent Laid-Open (Kokai) No. 2000-82830
(Patent Document 2) Japanese Patent Laid-Open (Kokai) No. HEI 09-270747
(Patent Document 3) Japanese Patent Laid-Open (Kokai) No. HEI 11-233911
(Patent Document 4) Japanese Patent Laid-Open (Kokai) No. 2002-98842
(Patent Document 5) Japanese Patent Laid-Open (Kokai) No. HEI 04-329699

However, in the optical module, which is shown in the above mentioned FIG. 23, since an optical element 101 and a ferrule 104 are optically coupled by lenses 102 and 103, they have a relatively favorable optical coupling efficiency, though, there is a problem in promoting miniaturization and cost reduction because the number of components are comparatively large.

Additionally, in the technique described in Patent Document 1, since the number of components is relatively large, there is the same problem in the case of FIG. 23, and additionally in order to improve the coupling efficiency needed for lower power consumption, another difficulty arises as follows.

That is, the coupling efficiency between the micro-lens and the optical fiber becomes relatively lower than that of the one shown in FIG. 23, especially between the light emitting element and the single-mode fiber. Furthermore, since a spacer 114 is configured by resin molding and has a relatively larger size, a thickness error tends to occur. Therefore, errors also tend to occur regarding the interval between the optical element and the micro-lens, in some cases causing a problem to stabilize the optical coupling efficiency.

In addition, the technique described in the above mentioned Patent Document 2 to 5 is not intended to provide a technique for promoting miniaturization and cost reduction through the above mentioned reduction of the number of components and concurrently for improving the coupling efficiency needed for low power consumption.

SUMMARY OF THE INVENTION

An object of the present invention is to reduce the number of components for miniaturization and cost reduction. Another object of the present invention is to achieve an optical coupling of high efficiency and stability.

Furthermore, still another object is to enhance the usefulness of the substrate.

Such being the case, according to the present invention there is provided a substrate adapted for interconnecting optical elements comprising a substrate body, wherein the substrate body is comprised of an electric wiring layer disposed on a first substrate body surface in such a manner as to be capable of electrically connecting a first optical element mounted on the side of the first substrate body surface; and an optical transmission path, which propagates lights being transmitted and received between the first optical element, which is electrically connected at the electric wiring layer and a second optical element disposed on the side of a second substrate body surface, which is different from the first substrate body surface in the pertinent substrate body.

In this case, preferably, the first surface of the substrate body in the substrate body is set to be the surface defined in the width direction and length direction of the substrate body, while the second substrate body surface in the substrate body is configured as the back surface of the first substrate body surface in the substrate body, and further the optical transmission path is configured in such a manner as to provide a communication or connection between the first and second substrate body surfaces in the thickness direction of the substrate body.

Further, it is allowable that in the case where the first optical element is arranged such that an optical component disposed at the first optical element faces the first substrate body surface, there is provided a spacing setting mechanism for providing spacing between the optical component and the substrate body.

Furthermore, it is possible that at the first substrate body surface of the substrate body, there are provided a first area, where the electric wiring layer is formed, and a second area, which is surrounded by the electric wiring layer, without the electric wiring layer being formed, and the spacing setting mechanism is constituted by the recess being formed of the first area surrounding the second area along with the second area.

Moreover, the substrate body can be a flexible wiring sheet.

Further, it is allowable that the optical transmission path is constituted by a lead-through path, which leads through the first substrate body surface and the second substrate body surface.

Furthermore, it is possible that the lead-through path is filled with light transmissive material, whose refractive index is matched with that of the first or second optical element.

Moreover, the substrate body can be formed of a light transmissive material.

Further, it is possible that the optical transmission path includes a lens, which has been formed on the substrate body facing the optical component of the first or second optical element.

In this case, preferably, an antireflection coating is formed on the surface of the lens.

Furthermore, according to the present invention there is provided an optical module, comprising: a substrate; a first optical element having an optical component which emits light or on which light is made incident, and being disposed such that the optical component faces a first substrate face side in the substrate, and a second optical element disposed on a second substrate face side in the substrate; the substrate comprising a substrate body, wherein the substrate is comprised of: an electric wiring layer, disposed on a first substrate body surface, in such a manner as to be capable of electrically connecting a first optical element mounted on the side of the first substrate body surface; and an optical transmission path, which propagates lights being transmitted and received between the first optical element which is electrically connected at the electric wiring layer, and a second optical element disposed on the side of a second substrate body surface, which is different from the first substrate body surface in the substrate body.

Moreover, in the above mentioned optical module, preferably, it is possible that the first substrate body surface in the substrate body is set to be the surface defined in the width direction and length direction of the substrate body, while the second surface of the substrate body in the substrate body is configured as the back surface of the first surface of the substrate body in the substrate body, and further the optical transmission path is configured in such a manner as to provide a communication or connection between the first and second substrate body surfaces in the thickness direction of the substrate body.

Further, it is possible that at the first substrate body surface of the substrate body, there are provided a first area, where the electric wiring layer is formed, and a second area, which is surrounded by the electric wiring layer, without the electric wiring layer being formed, and on the second region the first optical element is disposed.

In this case, it is possible that by the recess being formed of the first area surrounding the second area along with the second area there is constituted a spacing setting mechanism for providing spacing between the optical component and the substrate body.

Further, the substrate body can be a flexible wiring sheet.

Furthermore, it is possible that the optical transmission path is constituted by a lead-through path, which leads through the first substrate surface and the second substrate surface.

In this case, it is possible that the lead-through path is filled with light transmissive material, whose refractive index is matched with that of the first or second optical element.

Moreover, substrate body can be formed of a light transmissive material.

Further, it is allowable that the optical transmission path includes a lens, which has been formed on the substrate body facing the optical component of the first or second optical element.

In this case, an antireflection coating can be formed on the surface of the lens.

Furthermore, it is allowable that the second optical element is an optical transmission element enabling optical transmission.

In this case, the optical transmission element can be an optical fiber or a ferrule, in which the optical fiber is built-in.

Moreover, the first optical element can be a surface light outgoing type light emitting element, or a surface light incident type light receiving element.

Further, the substrate according to the present invention is characterized in that it is light transmissive in the thickness direction.

Furthermore, the substrate can be comprised of a flexible substrate, capable of being bent.

Moreover, it is allowable that an optical element is provided on the substrate as a source of emission or reception of the light, and an electric wiring with regard to the optical element is formed on the substrate.

Thus, the present invention provides an electric wiring layer, to which the first optical element can be connected, on the first substrate body surface of the substrate body, and concurrently, provides an optical transmission path which transmits light transmitted and received between the first optical element, which is connected on the electric wiring layer, and the second optical element, which is disposed on the surface of the second substrate body of the substrate body concerned, to be a substrate adapted for interconnecting optical element, whereby there can be configured an optical module using this as a substrate, with the result that it is made possible to reduce the number of components for miniaturization and low cost. And high-efficient and stable optical coupling for low-power dissipation can be achieved.

Further, according to the present invention, since the substrate transmits light in the thickness direction, the usability or usefulness of the substrate can be enhanced. Moreover, the substrate can be handled as an optical component.

The above and other objects, features and advantageous of the present invention will be apparent from the following description and the appended claims, taken in conjunction with the accompanying drawings in which like parts or elements are denoted by like reference characters.

Each of FIGS. 2 to 12 is a view illustrating the manufacturing process of the optical module according to the first embodiment of the present invention.

Figure 13:
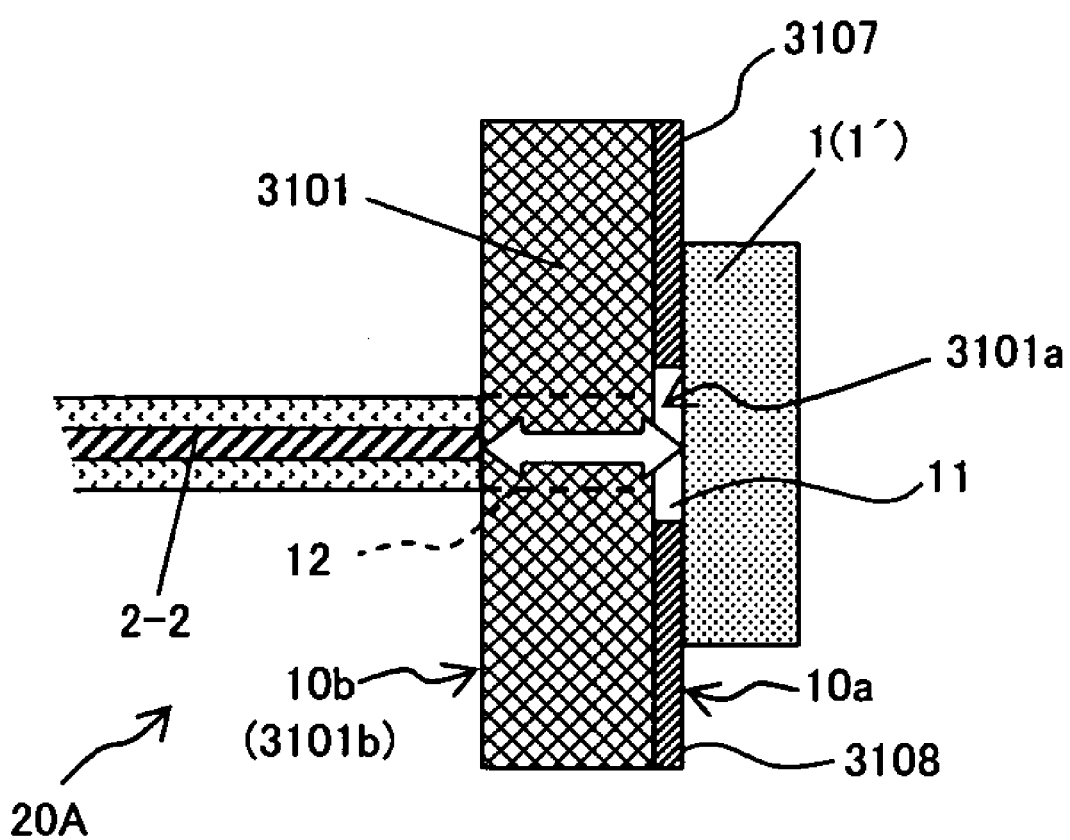

FIG. 13 is a schematic diagram illustrating the variation of the first embodiment of the present invention.

Figure 14:
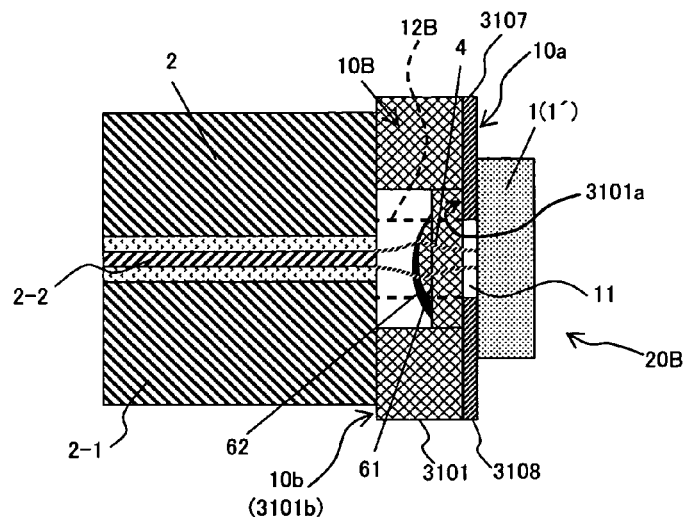

FIG. 14 is a schematic diagram illustrating the second embodiment of the present invention.

Each of FIGS. 15 to 19 is a view illustrating the manufacturing process of the substrate adapted for interconnecting optical elements according to the second embodiment of the present invention.

Figure 20:
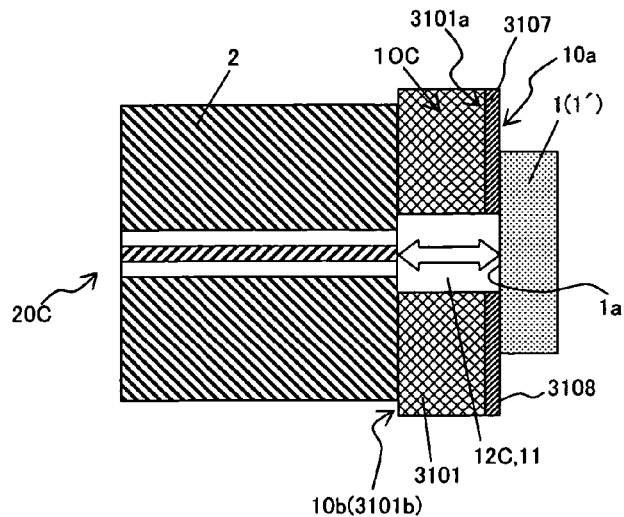

FIG. 20 is a schematic diagram illustrating the third embodiment of the present invention.

Figure 21:
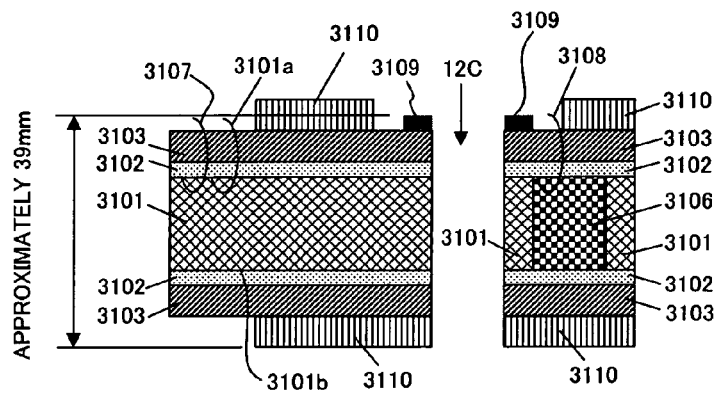

FIG. 21 is a view illustrating the manufacturing process of the substrate adapted for interconnecting optical elements according to the third embodiment of the present invention.

Figure 22:
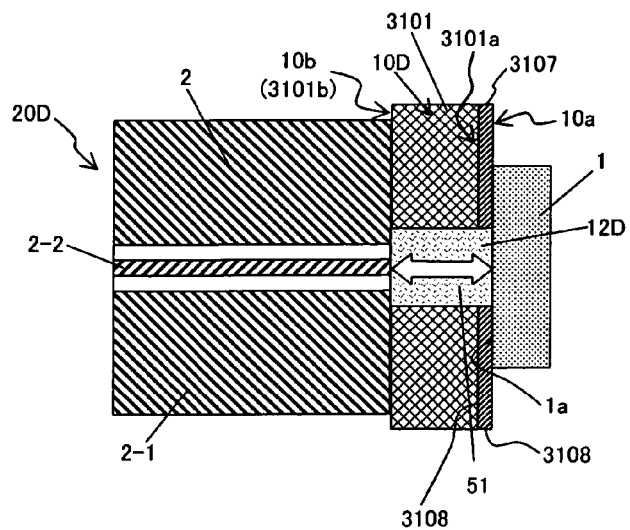

FIG. 22 is a schematic diagram illustrating the variation of the third embodiment of the present invention.

Figure 23:
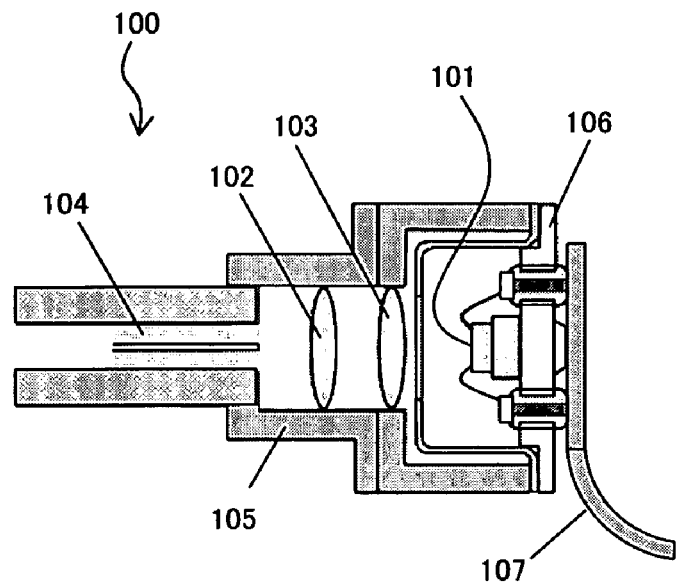
Figure 24:
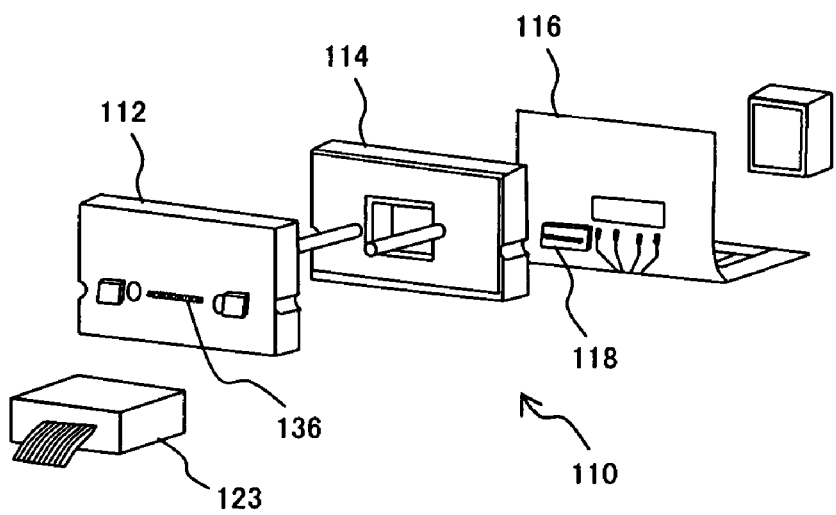

Both FIGS. 23 and 24 are views illustrating the prior art.

DESCRIPTION OF THE PREFERRED EMBODIMENTS

Referring to diagrams below, embodiments of the present invention will be described.

[A] Description of the First Embodiment

Figure 1:
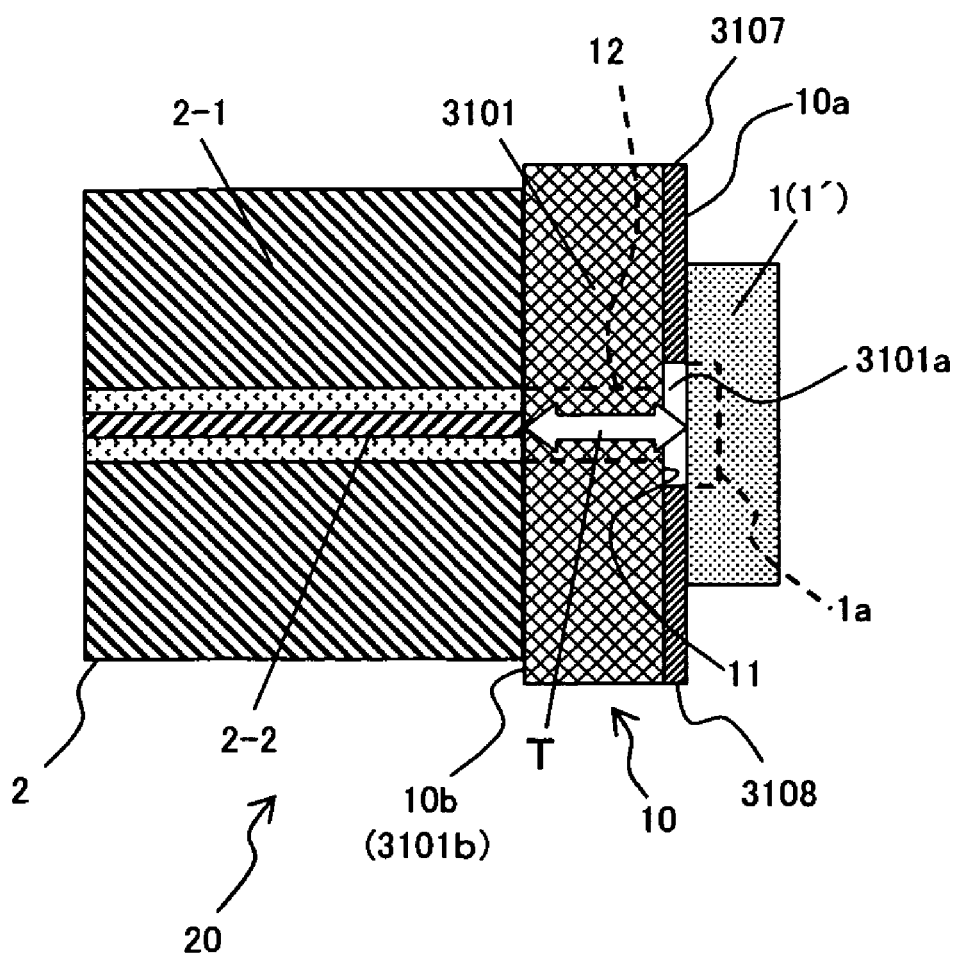
FIG. 1 is a schematic diagram illustrating the first embodiment of the present invention.

FIG. 1 is a schematic diagram illustrating the first embodiment of the present invention, FIGS. 2 to 7 are views illustrating the manufacturing process of a substrate 10 according to the first embodiment of the present invention, and FIGS. 8 to 11 are views illustrating that of an optical module 20 according to the first embodiment of the present invention, respectively.

"Structuring of Substrate"

On one side of the substrate 10 shown in FIG. 1, a surface light outgoing type light emitting element 1 is mounted as a first optical element, and on the other side a ferrule 2 is mounted as a second one.

Additionally, as for the substrate 10, it is preferable to use a flexible substrate, and here, a polyimide film 3101 being employed as an example. Here, the surface light outgoing type light emitting element 1 is disposed in such a way that a light-emitting component 1*a*, which is its optical component, faces the side of a first surface 3101*a* of the polyimide film 3101 (the surface of the first substrate body) on a first surface 10*a* (the first substrate surface) of the substrate 10, and cause the light emission from the light-emitting component portion to the substrate side. On the other hand, the ferrule 2 is mounted by a butt coupling connection on the second surface 10*b* (the second substrate surface) of the substrate 10, that is on the second surface 3101*b* side (the second substrate body surface), which is the backside of the first surface 3101*a* on the polyimide film 3101.

Here, the ferrule 2 is configured in such a way that, for example, the optical fiber 2-2 is embedded in the glass member 2-1, and the ferrule 2 and the second surface 10*b* of the substrate 10 is butt-coupled (butt-connected) with each other, so that the end portion of the optical fiber 2-1 abuts on the second surface 10*b* of the substrate 10.

Additionally, the surface 3101*a* of the first substrate body of the polyimide film 3101 is provided with electric circuit wiring patterns 3107 and 3108, which are an electric wiring layer that can be connected to the surface light outgoing type light emitting element 1 mounted onto the surface 3101*a* side of the first substrate body. That is, the surface light outgoing type light emitting element 1 is controlled by the electric signal being inputted via electric circuit wiring patterns 3107 and 3108, and can emit a transmission optical signal from the optical component 1*a*.

Additionally, the electric circuit wiring pattern 3107 can be constituted as a wiring pattern for providing the electric signal to the surface light outgoing type light emitting element 1, while the electric circuit wiring pattern 3108 can be constituted as the circuit pattern for an electric power source or the grounding.

Further, the polyimide film 3101 is a material transparent to the light emitted from the surface light outgoing type light emitting element 1, exhibiting light transmissive characteristics for the optical signal of, for example, 1.3 µm wave band width, as a light emitted from the surface light outgoing type light emitting element 1. Furthermore, as well in the event of other material selected for the substrate body, there are selected materials having light transmission characteristics, employed as an optical module.

The light emitted at the above mentioned light-emitting component 1*a* passes through and is propagated through the polyimide film 3101, entering the end portion of the optical fiber 2-2, which abuts on the second surface 10*b*. Accordingly, the section of the substrate adapted for interconnecting optical elements 10, which extends ranging from the above mentioned concave portion 11 to the abutting location of the optical fiber 2-2 on the second surface 10*b*, is configured as an optical transmission path 12, which can propagate the light, which is transmitted from the light-emitting component 1*a* of the surface light outgoing type light emitting element 1, which is electrically connected by means of the electric circuit wiring patterns 3107 and 3108.

Further, the above mentioned light-emitting component 1*a* and the end surface of the optical fiber 2-2, which abuts on the second surface 10*b*, can be disposed on the surface 10*a* and 10*b*, respectively, so as to be located at a position in association with to each other, that is, so as to be at the shortest distance from each other. Thus, the light transmitted from the light-emitting component 1*a* can be made incident onto the optical fiber 2-2, by providing communication or connection between the first surface 10*a* and second surface 10*b* in the thickness direction T.

When the above mentioned surface light outgoing type light emitting element 1 is disposed with its light-emitting component 1*a* facing (opposing) the first surface 10*a*, the concave portion 11 is formed as an spacing setting mechanism for providing a spacing between the light-emitting component 1*a* and the polyimide film 31 concerned. Even when the surface light outgoing type light emitting element 1 is disposed on the substrate adapted for interconnecting optical elements 10 in the above mentioned direction, the recess 11 will constitute a spacer, which enables to protect the end face of the light-emitting component 1a from contacting with the substrate surface. Moreover, the concave portion 11 can be formed, as described later, by a semiconductor manufacturing technique such as lithography, and dimensions in the depth direction can be set more precisely than a resin molding technique.

When the substrate is radiated with light, it is desirable to form the electric wiring on the substrate with the avoidance of any portion for light propagation. That is, when light with a predetermined spot size is inputted, the electric wiring is formed in such a way that the transmission should not be impeded by any electric wiring and the like. Needless to say, when the substrate is multi-layered, it is preferable that wiring in each layer be formed so as not to impede the transmission of light as well.

"Manufacturing Method for Substrate"

As for the above mentioned substrate 10, it can be manufactured as shown in FIGS. 2 to 7. Here, FIGS. 2 to 7 are elevation in vertical section, which is perpendicular to the first surface 10a and second surface 10b of the substrate.

Figure 2:
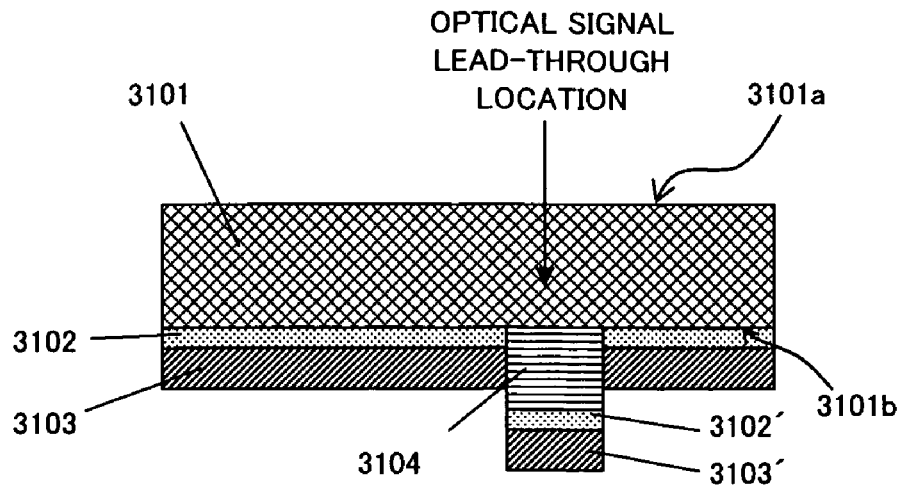

Firstly, as shown in FIG. 2, for example, a polyimide film 3101 is prepared, whose thickness is approximately 25 μm, as a base film, that is a substrate body. In the event of applying the polyimide film with the thickness of approximately 25 μm to a base film, the substrate adapted for interconnecting optical elements 10 can be a flexible substrate, whose structure can be easily bent. Moreover, in addition to this manufacturing method, it is possible to use FPC (Flexible Printed Circuit), which is generally used as a flexible wiring sheet, as a flexible substrate, and its manufacturing method is applicable.

Then, on the back surface 3101b of the polyimide film 3101, lower side face in the figure, about 1 μm of Au layer 3103 is deposited by evaporation with a tight adhesive material of 0.1 μm thickness of Ti-layer 3102, except for the location where the optical signal is expected to be transmitted. The above mentioned Ti-layer 3102 and Au-layer 3103 function as electric circuit wiring patterns 3107 and 3108, capable of electrically connecting the surface light outgoing type light emitting element 1 to be mounted in a subsequent process. Herein as stated hereinafter, it is also permissible to provide the pertinent layer on the front face 3101a, the upper face in the figure, which is opposite to the back surface of the polyimide film 3101.

Figure 3:
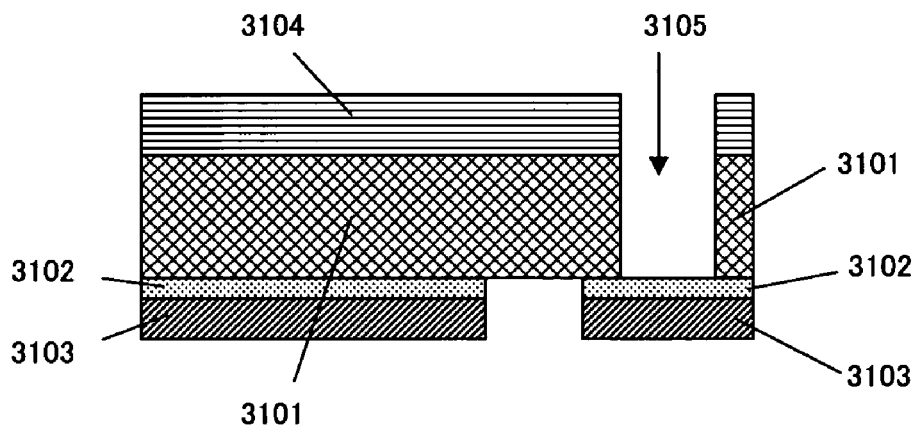

Then, through a photolithography technique, only the location where the optical signal is propagated (namely the formation location of the optical transmission path 12) is protected by the resist 3104, whereupon the Ti-layer 3102, then the Au-layer 3103 is deposited by evaporation. And when being dipped in the liquid acetone and the like, which dissolves resist 3104, as shown in FIG. 3, the Ti-layer 3102' and Au-layer 3103', which are portions protected by the resist 3104, are detached from the polyimide film 3101, the Ti-layer 3102 and Au-layer 3103 at other areas are caused to remain. Thus far, patterning by lift-off method is described, however, in place of this, etching method can be used to perform patterning.

Figure 4:
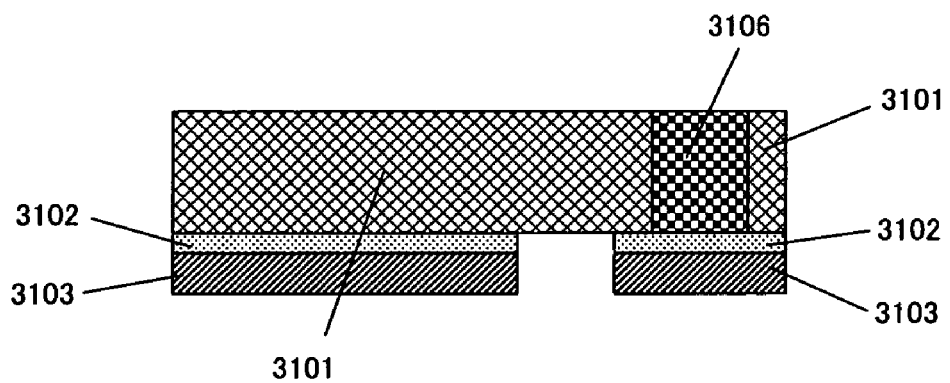

Next, as shown in FIG. 3 and FIG. 4, an electric connection area 3106 is formed in order to provide an electric connection between an electric wiring pattern to be formed on the surface 3101a side (the upper side surface in the drawing) of the polyimide film 3101, (refer to the symbol 3108 in FIG. 5) and Ti-layer 3102 and Au-layer 3103 of the back surface in the subsequent process. In addition, this electric connection area 3106 has a function to adjust the characteristic impedance in the electric circuit component of the whole substrate adapted for interconnecting optical elements 10.

Here, as shown in FIG. 3, after forming the resist 3104 on the surface 3101a of a film 3101, a hole 3105 is made at the location where the electric connection area 3106 is to be formed by, for example, $O_2$-RIE (Reactive Ion Etching). Then, as shown in FIG. 4, in order to have a secure electric conduction, after removing the resist 3104, a conductive material solder and the like is filled inside the hole 3105 by screen printing and the like to form the electric connection area 3106.

Figure 5:
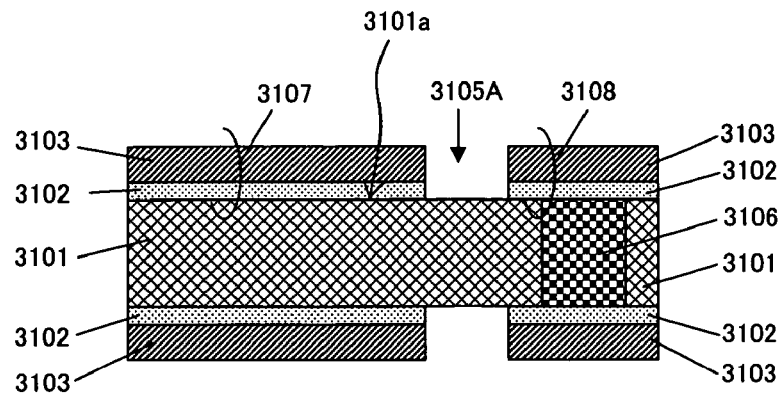

Further, as shown in FIG. 5, on the surface 3101a side of the polyimide film 3101, there are prepared electric circuit wiring patterns 3107 and 3108 being comprised of Au-layer 3103 and Ti-layer 3102, in the same manner as in the case of FIG. 2 and FIG. 3, by a lift-off method. Then, in the location intended to form the optical transmission path 12 for transmitting the optical signal, there are not formed electric circuit wiring patterns 3107 and 3108.

Accordingly, on the first surface 3101a of the polyimide film 3101, electric circuit wiring patterns 3107 and 3108 are formed as a first area, and, a second area 3105A is provided, which is surrounded by electric circuit wiring patterns 3107 and 3108, with any electric wiring layer not being formed. And the second area 3105A constitutes a recess 11 as a spacing setting mechanism.

That is, a resist, which is not shown, is applied on the side of the surface 3101a, and through a photo lithography technique using a double sided aligner there is removed the resist at the location, where desired circuit patterns are formed. The width of the electric circuit wiring pattern 3107, which transfers the electric signal, is set such that the characteristic impedance becomes almost equal to the differential resistance of the light-emitting element 1.

As mentioned above, by providing the substrate adapted for interconnecting optical elements 10 comprising electric circuit wiring patterns 3107, 3108 and the electric connection area 3106, the surface light outgoing type light emitting element 1 can be fed with an electric signal for photo-electric conversion, therefore, it becomes possible to accommodate an IC (Integrated Circuit), not shown, which is an electric transmission signal processing circuit for performing electric signal processing for a transmission signal, on the substrate adapted for interconnecting optical elements 10. Additionally, this IC can be mounted on the substrate as well.

Figure 6:
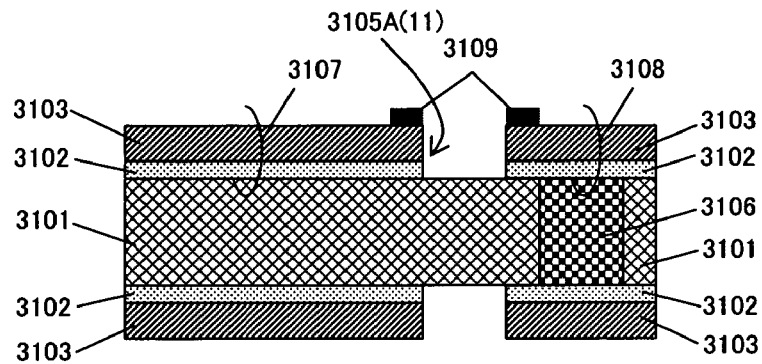

Then, as shown in FIG. 6, a solder bump 3109, composed of Sn-layer with approximately 2 μm thickness and Au-layer with approximately 0.1 μm thickness, is formed by the lift-off method at a predetermined location. The predetermined location is, for example, a location where an electric contact is made between electric circuit wiring patterns 3107 and 3108 and the surface light outgoing type light emitting element 1. That is, while the surface light outgoing type light emitting element 1 is affixed through melting by the solder bump 3109, an electric signal for emitting an optical signal can be received from IC and the like, not shown, through the solder bump 3109.

Figure 7:
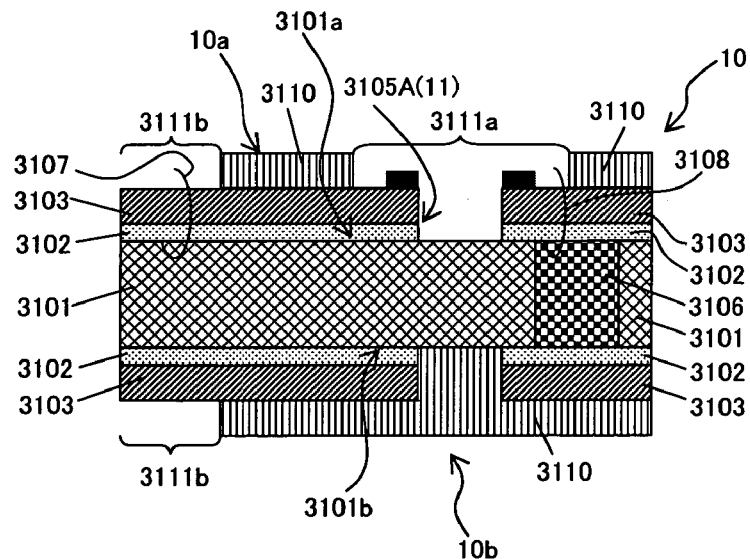

Additionally, as shown in FIG. 7, a protection layer 3110 for the front and back side surface is formed by the photosensitive polyimide layer with the thickness of approximately 10 μm by using a spin coater and the like, and, windows 3111a and 3111b are disposed where there is made an electric contact with the surface light outgoing type light emitting element 1 and the IC, not shown, constituting the transmission electric signal processing circuit. Windows 3111a and 3111b are areas where the above mentioned protection layer 3110 is not formed, and photolithography technique is employed for the window-opening process.

By the above mentioned process, the substrate adapted for interconnecting optical elements 10 according to the present invention is manufactured. Here, the substrate surface on the side where the solder bump 3109 in FIG. 7 is formed is the first surface 10a, and the back surface of this substrate surface is the second surface 10b. And, in the window 3111a on the above mentioned first surface 10a, the surface light outgoing type light emitting element 1 is disposed, and at the location on the second surface 10b, which corresponds to the location of 3111a (formation location of the protection layer 3110 formed on the second surface 10b) the ferrule 2 is disposed.

In addition, the optical coupling efficiency between the surface light outgoing type light emitting element 1 and the ferrule 2, which a remounted in the subsequent process, depends on the optical length between the surface light outgoing type light emitting element 1 and the ferrule 2. Then, in the manufacturing of the above mentioned substrate adapted for inter connecting optical elements 10, in the event that the first and second optical elements, in this case the surface light outgoing type light emitting element 1 and the ferrule 2, are mounted on the substrate adapted for interconnecting optical elements 10, it is necessary to determine the thickness of the substrate adapted for interconnecting optical elements 10 in such a manner as to provide an optical path length allowing the optical coupling efficiency between these first and second optical elements 1 and 2 to become optimal.

In this case, for example, by properly selecting the thickness of the thing which is prepared for the base film, or by properly setting the thickness of Ti-layer 3102 and Au-layer 3103, which is formed as an electric wiring layers, the optical path length can be obtained, such that the above mentioned optical coupling efficiency becomes optimal.

"Manufacturing Method for Optical Module"

Figure 8:
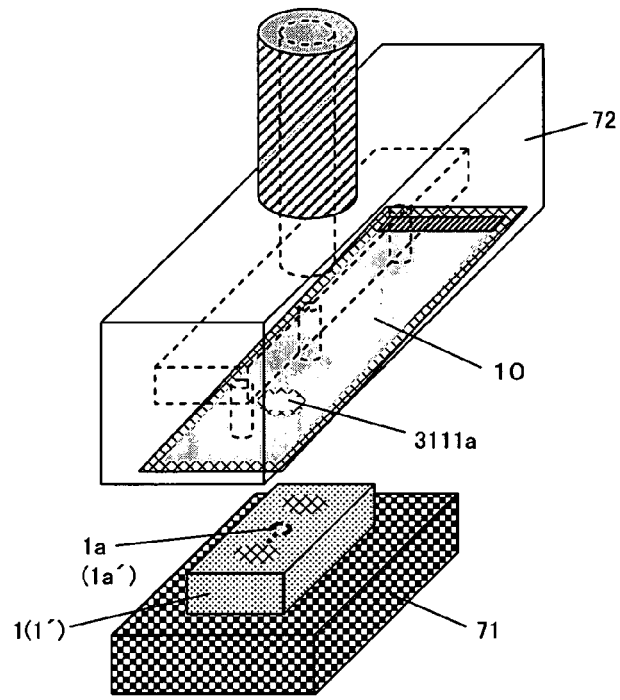
Figure 9:
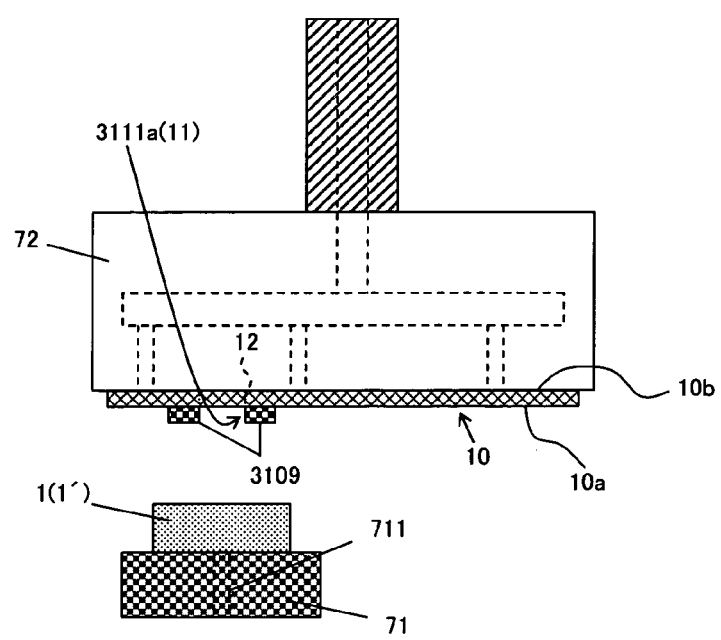
Figure 10:
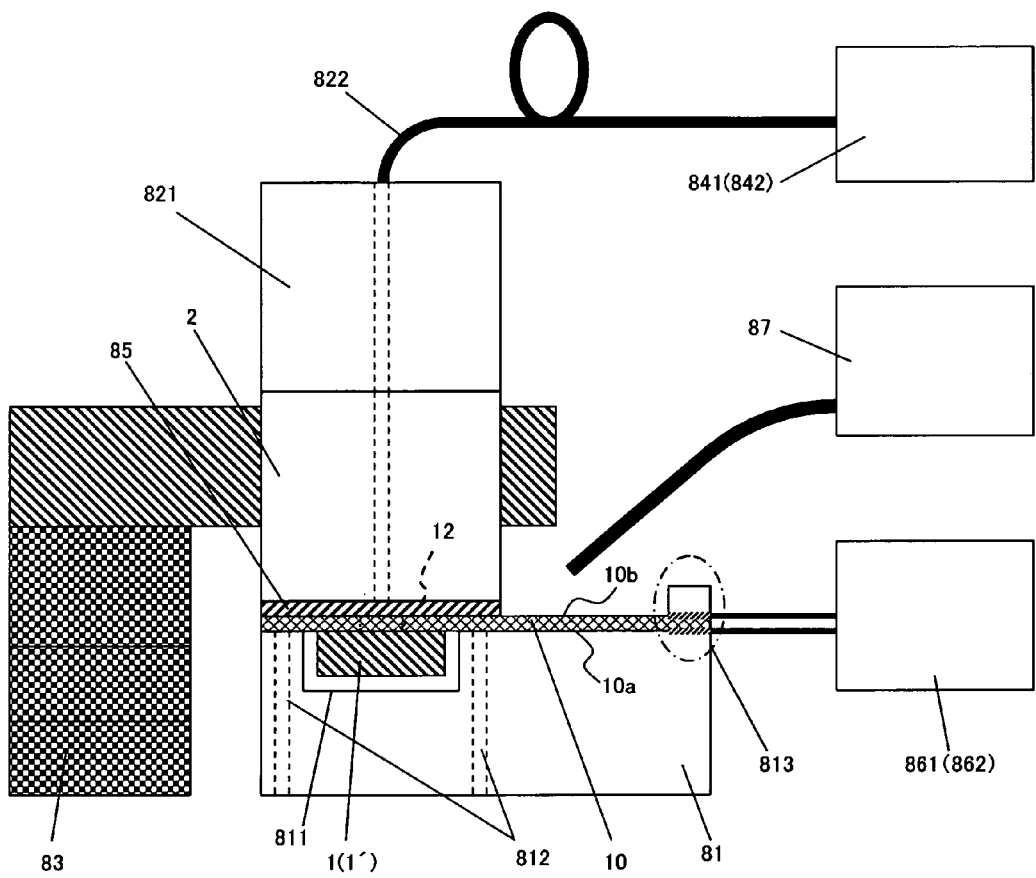

FIGS. 8 to 10 are schematic diagrams for explaining the process, in which the surface light outgoing type light emitting element 1 and the ferrule 2 are provided on the substrate 10 manufactured as described above. In addition, while the surface light outgoing type light emitting element 1 and the ferrule 2 are mounted on the substrate adapted for interconnecting optical elements 10, there are also mounted circuit modules such as ICs required according to the electric wiring formed on the substrate 10.

Firstly, for example, according to the following procedure, by using a dye-bonder, the surface light outgoing type light emitting element 1 is mounted (installed) on the first surface 10a of the substrate 10. For example, as shown in FIG. 8, with the light-emitting surface (light-emitting component 1a) of the surface light outgoing type light emitting element 1 directed upwardly the light emitting element 1 is mounted on the heater stage 71 of the dye-bonder, and the element 1 is fixed by the adsorption hole 711, which is built-in in the heater stage.

And as shown in FIG. 9, there are aligned the window 3111a {corresponding to the second area 3105 (refer to FIG. 7)} of the substrate 10, whose second surface 10a is adsorbed by an adsorption tool 72, and the light-emitting component 1a of the surface light outgoing type light emitting element 1. Then, it is hard to visually confirm the light-emitting component 1a of the surface light outgoing type light emitting element 1, however, for example, while using an apparatus for image recognition, an accurate alignment is performed. Specifically, the light-emitting component 1a of the surface light outgoing type light emitting element 1 is stored in the apparatus for image recognition, and then its location is displayed on the monitor screen. In the portion of the second surface 10b of the substrate 10, where an optical signal is outputted, since Ti-layer 3102 and Au-layer 3103 are removed, its center is aligned with the displayed position of the light-emitting component 1a of the surface light outgoing type light emitting element 1.

Next, as shown in FIG. 10, according to the following procedure, the ferrule 2 is connected to the second surface 10b of the substrate 10. Firstly, the substrate 10 is placed on an adsorption table 81, with the first surface 10a being made to face downward, on which the surface light outgoing type light emitting element 1 is mounted. Additionally, on the adsorption table, a groove 811 is formed, which accommodates the surface light outgoing type light emitting element 1, and an adsorption hole 812 is formed in advance in such a manner as to open around the groove 811.

The electric wiring pattern of the substrate 10, refer to 3107 and 3108 in FIG. 7, is made to contact with a connector 813 for electric connection on the stage at the end portion of the substrate on the side opposite to the surface light outgoing type light emitting element 1. It is because electric signal is supplied to the surface light outgoing type light emitting element 1 via this connector 813 in the event of the adjusting of the optical axis, which is a post-process. And the ferrule 2 to be mounted is connected to the optical fiber 822 via an optical connector 821, and is fixed on a micro motion stage. Further, to the tip of the optical fiber 822, an optical power meter 841 is connected.

Next, on the upper surface of the substrate (the second surface 10b) which is fixed onto the adsorption table 81, an optical bond 85, having characteristics in that the refractive index is almost equal to that of the optical fiber 2-2 in the ferrule 2, is applied on a predetermined portion of the substrate 10. In addition, the predetermined portion refers to the backside of the location where the surface light outgoing type light emitting element 1 is mounted on the substrate 10. Here, the ferrule 2 is caused to approach until the optical bond 85 comes into contact with both the substrate 10 and the ferrule 2, then, by supplying an electric signal from a power source 861 to the surface light outgoing type light emitting element 1, while causing the element 1 to emit light, based on the indication value of an optical power meter 841, the position of the ferrule 2 is adjusted so as to be placed where the indication value becomes maximum.

And, after completing the positioning of the ferrule, the ferrule 2 is made to come completely in contact with the substrate 10, and by using a UV light source and the like 87, the optical bond 85 is made to be cured. Additionally, from the viewpoint of a high-efficiency optical coupling and mass scale production fashion, the curing time of the optical bond 85 should be shorter, and UV-curing bond is preferable to be employed as the optical bond 85.

Through the above mentioned process, the surface light outgoing type light emitting element 1 and the ferrule 2 are mounted on the substrate 10, and an optical module 20 (refer to FIG. 11) can be configured as a transmission module. Further, in the above mentioned manufacturing process, the surface light outgoing type light emitting element 1 is mounted on the substrate 10 by the solder bump 3109 and the ferrule 2 being mounted on the substrate 10 through the butt joint connection by the optical bond 85, however, it is allowable that at least one of the surface light outgoing type light emitting element 1 or the ferrule 2 may be mounted on the substrate 10.

Figure 11:
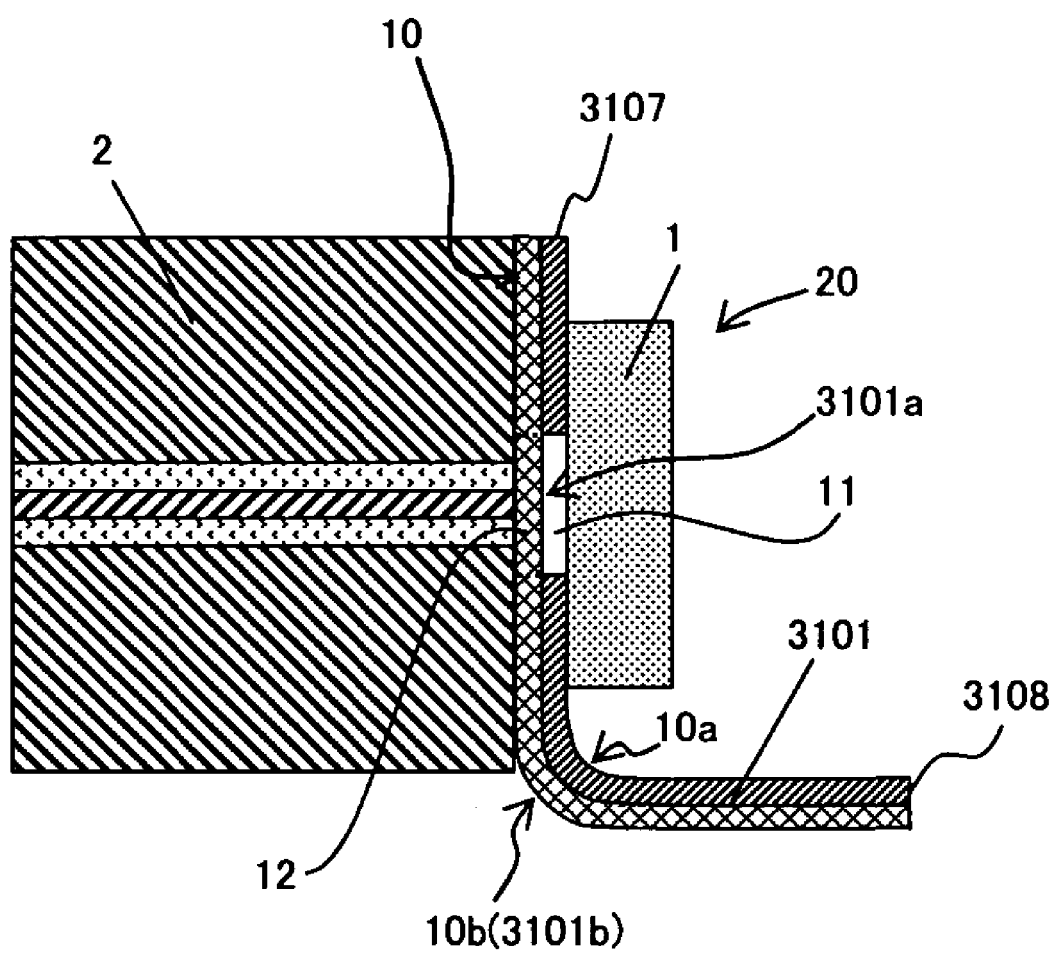
Figure 12:
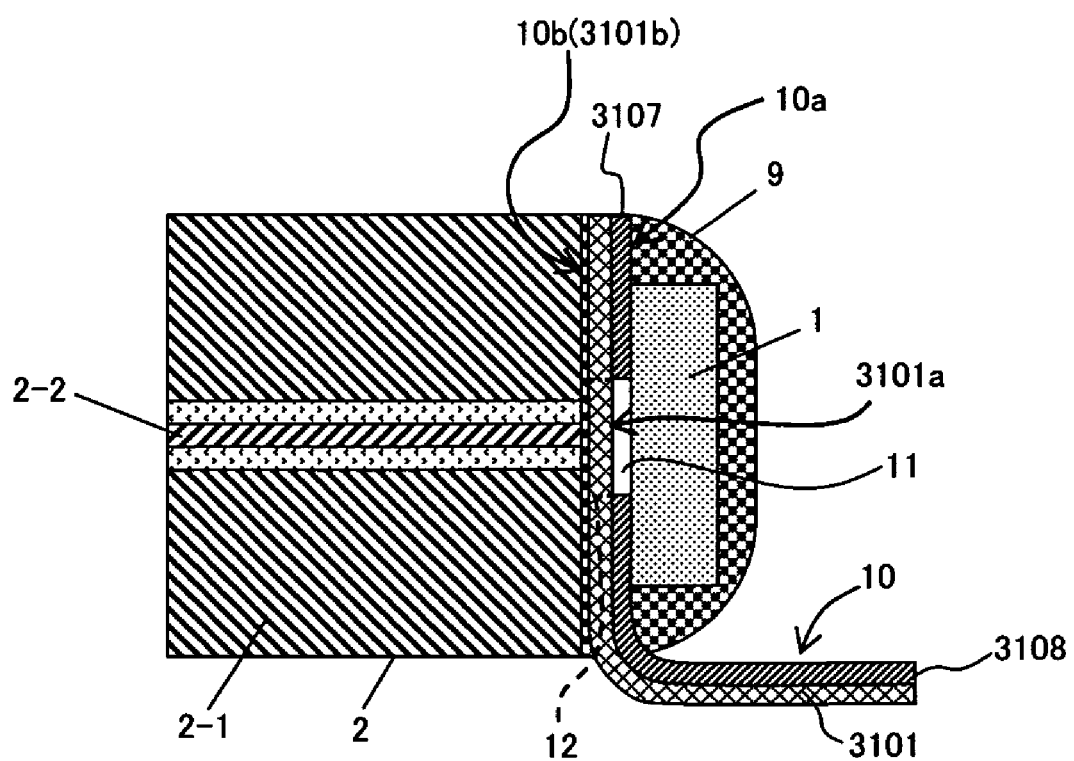

Further, since the substrate 10 is constructed as the above mentioned easily bent flexible wiring sheet, in the optical module 20, for example as shown in FIG. 11, the surface light outgoing type light emitting element 1 and the portion where other electric wiring patterns are formed can suitably be bent in accordance with an installation space as the optical module 20. Furthermore, since the degree of freedom pertaining to the direction to transmit the optical signal increases, the degree of freedom pertaining to the installation of the optical module can be enhanced. In this case, as shown in FIG. 12, since the surface light outgoing type light emitting element 1 is mechanically protected, the element 1 can be coated by a chip coating resin 9 and cured. Alternatively, a cap material and the like made of ceramics and the like can cover the element 1.

In the optical module 20, which is configured as mentioned above, each of the surface light outgoing type light emitting element 1, as the first optical element, and the ferrule, as the second optical element, is located on the front and back surfaces 10a and 10b of the substrate 10, respectively, and the optical signal can be delivered through the optical transmission path 12 in the substrate 10. Thus, the surface light outgoing type light emitting element 1 and the ferrule 2 can be optically coupled only by the interposing of a single component, that is the substrate 10.

Herein, the substrate 10 concurrently has a function as a spacer to define the gap between the surface light outgoing type light emitting element 1 and the ferrule 2. That is, by the substrate 10 being interposed between the surface light outgoing type light emitting element 1 and the ferrule 2, the length of the optical path between the surface light outgoing type light emitting element 1 and the ferrule 2 can be optimally set. Then, since the substrate 10 is manufactured by a semiconductor manufacturing process, compared with the case, in which a spacer is manufactured by the technology of molding, the gap width can stably be narrowed, while setting the accuracy of dimension to be comparatively higher, whereby the optical path length between the surface light outgoing type light emitting element 1 and the ferrule 2 can be set much more precisely than in the case of the conventional technique, therefore, the optical coupling efficiency can be drastically stabilized.

Further, since the substrate 10 is provided with an area 3105A (refer to FIG. 7) being comprised of a recess 11 as a spacing setting mechanism, at the mounting unit of the surface light outgoing type light emitting element 1, the light-emitting component 1a of the surface light outgoing type light emitting element 1 can be protected from being contacted with the substrate surface.

Such being the case, since according to a first embodiment of the present invention, the substrate adapted for interconnecting optical elements 10 is provided with the polyimide film 3101, and is provided with the electric circuit wiring patterns 3107 and 3108, capable of electrically connecting the surface light outgoing type light emitting element 1, as the first optical element, on the first substrate body surface 3101a of the polyimide film 3101, and also is provided with the optical transmission path 12, which propagates lights transmitted and received between the surface light outgoing type light emitting element 1, which is electrically connected at the electric circuit wiring patterns 3107 and 3108, and the ferrule 2, which is disposed on the side of the second substrate body surface 3101b as the second optical element, there are achieved advantages that the number of components can be reduced leading to miniaturization and low cost, and, a high-efficiency and stable optical coupling leading to low power dissipation can be obtained.

Incidentally in the above mentioned first embodiment, the surface light outgoing type light emitting element 1 is provided on the first surface 10a of the substrate 10 as an optical element, while on the second surface 10b, there is provided the ferrule 2, which is an optical transmission element, so as to configure a transmission module to transmit optical signal, however, according to the present invention, optical element other than these can be provided on the first surface 10a and second surface 10b.

That is, the substrate is employed as a member allowing light to pass through the substrate in the thickness direction (that is, the member having the optical transmission path as shown in FIG. 1). Then, in order to enhance the degree of the freedom pertaining to mounting it is preferable that the substrate should be a flexible substrate having an electric wiring, which can be bent. Needless to say, on at least one surface of the flexible substrate, an optical element is disposed, and used as an element causing transmission or reception of the light so as to be propagated in the direction of the thickness of the substrate, and there is formed on the flexible substrate the wiring used for the electric control and power supply and the like for the optical element.

Further, in the case where in place of the surface light outgoing type light emitting element 1 mounted on the first surface 10a, there is disposed the surface light incident type light receiving element 1' (refer to FIGS. 8 to 10), a receiving module for receiving the optical signal can be configured. In this case, in the manufacturing process of the substrate 10, the width of the wiring line, comprising the electric circuit wiring pattern 3107, is set in such a way that the characteristic impedance becomes almost equal to the input resistance of the IC, which is an electric circuit for receiving electric signal processing.

Further, in case of mounting the surface light incident type light receiving element 1' on the substrate adapted for interconnecting optical elements 10, the light receiving section 1a', which is the optical component, is hidden in the event of alignment with the substrate, so that, as in the case of the above mentioned alignment of the surface light outgoing type light emitting element 1 with the substrate 10, the alignment is carried out by using an apparatus for image recognition. Furthermore, in the alignment of the ferrule 2 with the substrate adapted for interconnecting optical elements 10, as shown in FIG. 10, a stabilized light source 842 is connected to the above mentioned optical connector 821 via the optimal fiber 822, and an ampere meter 862 is connected to a connector 813 for electric connection. Then, the stabilized light source 842 is made to emit light, and while there being monitored the light receiving current by the ampere meter 862, in association with the incident light from the surface light incident type light receiving element 1 through the ferrule 2, the position of the ferrule 2 is adjusted, whereupon the ferrule is affixed at the position where the indication value of the ampere meter becomes maximum.

Moreover, in place of the ferrule 2, as the above mentioned optical transmission element, for example shown in FIG. 13, it is permissible to adopt the optical module 20A connected to the substrate 10 as an optical fiber 2-2 in the form of a single component.

[B] Description of the Second Embodiment

FIG. 14 is a schematic diagram illustrating the second embodiment of the present invention, and FIGS. 15 to 19 are a view for explaining the manufacturing process pertaining to the substrate adapted for interconnecting optical elements 10B according to the first embodiment.

The optical module 20B shown in FIG. 14 is provided with the substrate adapted for interconnecting optical elements 10B, which is different from the above mentioned substrate adapted for interconnecting optical elements 10 according to the first embodiment. That is, in the substrate adapted for interconnecting optical elements 10B according to the second embodiment, on the optical transmission path 12 in the first embodiment, a lens 61 is formed. That is, in the optical transmission path 12B of the substrate adapted for interconnecting optical elements 10B in the second embodiment, there is included the lens 61 formed on the substrate adapted for interconnecting optical elements 10B, wherein the lens is facing the optical components of the first and second optical elements, which are the light-emitting component 1a of the surface light outgoing type light emitting element 1 mounted on the substrate adapted for interconnecting optical elements 10B, and the end portion of the optical fiber 2-2 in the ferrule 2.

Further, basically such is also the case with the above mentioned first embodiment, except for the above mentioned configuration of the substrate, so that the same symbols or numerals in FIGS. 14 to 19 denote almost the same portions as those in FIGS. 1 to 7. The surface light outgoing type light emitting element 1 and the ferrule 2 can also be mounted in the same process as that of the above mentioned first embodiment.

With this lens 61, it becomes possible to cause the size of the light beam emitted from the surface light outgoing type light emitting element 1, which is mounted on the substrate adapted for interconnecting optical elements 10B, to be the one, with which the beam can be effectively input into the optical fiber 2-2. That is, it is possible to further enhance the optical coupling efficiency of the surface light outgoing type light emitting element 1 and the ferrule 2. In addition, in case of mounting the surface light incident type light receiving element 1' in place of the surface light outgoing type light emitting element 1, it is also possible to cause the light emitted from the end portion of the optical fiber 2-2 to have the beam size, which can effectively be inputted into the surface light incident type light receiving element 1'. Moreover, in FIG. 14, the symbol 4 is an example of the shape of the optical beam, which is propagated from the surface light outgoing type light emitting element 1 into the optical fiber 2-2 through the optical transmission path 12B.

Furthermore, 62 is an antireflection coating, which is formed on the surface of the lens 61, and by the coating 62, the reflection of the light propagated through the optical transmission path 12B on the lens 61 can be prevented.

Figure 15:
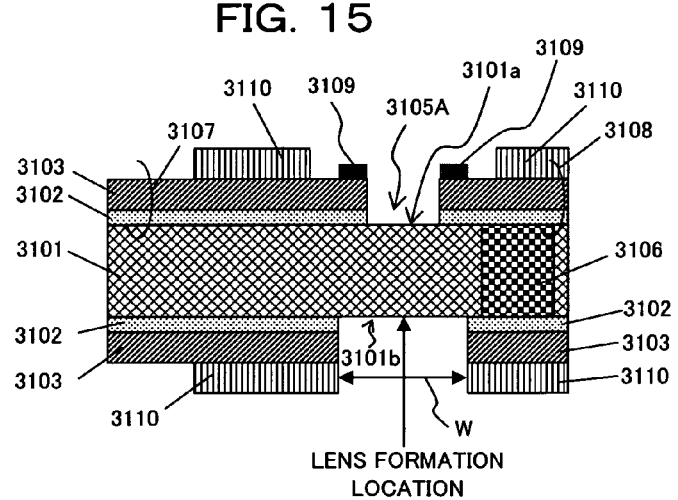

The above mentioned substrate adapted for interconnecting optical elements 10B can be prepared, for example, as follows. That is, by the same process as shown in the abovementioned FIGS. 2 to 6, after formation processes up to the protection layer 3110 are completed, and the lens 61 is formed at the location where light is transmitted according to the process shown in the following FIGS. 15 to 18, then the antireflection coating 62 is formed according to the process shown in FIG. 19. Further, in the second embodiment, the width of the second area 3105A, where the electric circuit wiring patterns 3107 and 3108 are not formed as the electric wiring layer formed on the lower surface 3101b of the polyimide film 3101, is made to be relatively wider than the case in FIG. 5, as shown in FIG. 15 according to the need.

Figure 16:
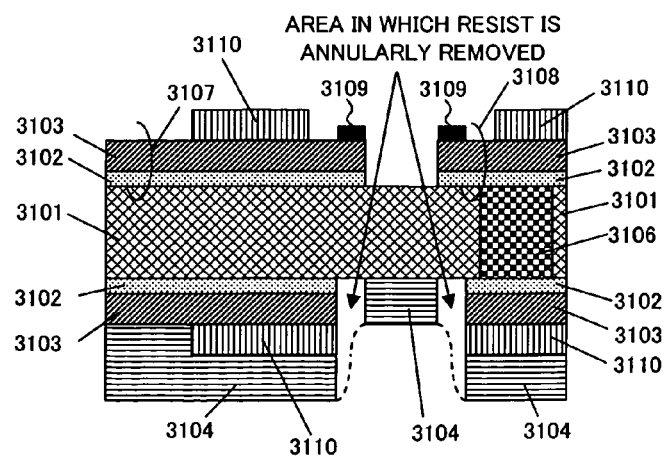
Figure 17:
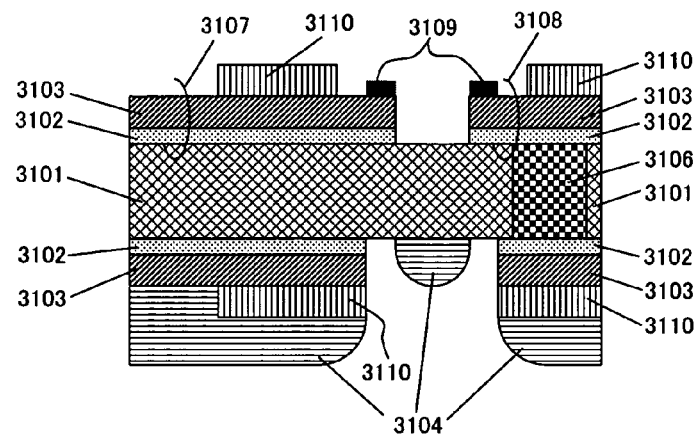
Figure 18:
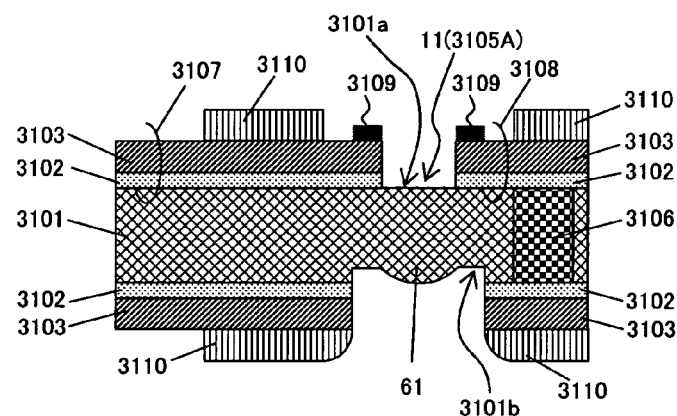

Firstly, following the process shown in FIG. 6, in order to form the lens 61 on the surface of the second substrate body of the polyimide film 3101, after the resist 3104 is applied onto the surface 3101b, on which the lens 61 concerned is to be formed, as shown in FIG. 16, through photo lithography technique, the resist surrounding the lens formation point is annularly removed. Then, by annealing it at approximately 200° C., the shape of the resist 3104 is deformed into a shape of convex lens, as shown in FIG. 17. Further, using it as a mask and performing etching by $O_2$-RIE apparatus can transfer the shape of a convex lens onto the lower surface 3101b of the polyimide film, as shown in FIG. 18. Thus, the lens 61 can be formed.

Figure 19:
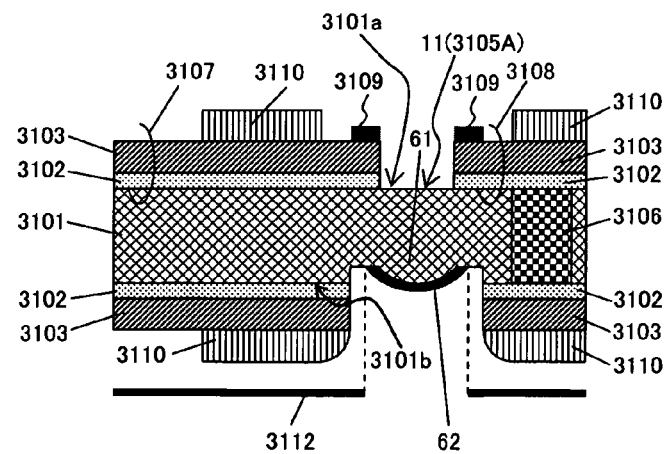

Furthermore, when forming an antireflection coating 62 on the surface of the lens 61, in order to avoid the separation caused by the stress concentration at the end portion of the antireflection coating, it is preferable that coating is formed only at the component of lens 61. This can be realized by, for example, as shown in FIG. 19, placing the shield plate 3112 with a hole at the portion of the lens 61 just in front of the second surface 10b, and carrying out the deposition of the antireflection coating 62.

In addition in connection with the polyimide film, whose refractive index is 1.5, as the layer constitution of the antireflection coating 62 there should preferably be formed the deposition of $Sb_2O_3$, whose refractive index n1 is 2.02 and thickness is $(½)×λ0/n1$ and deposition of $MgF_2$, whose refractive index n2 and thickness is 1.38, $(¼)×λ0/n2$ by evaporation respectively.

Thus, also in the second embodiment of the present invention, the substrate adapted for interconnecting optical elements 10B is provided with the electric circuit wiring patterns 3107 and 3108, to which the surface light outgoing type light emitting element 1, as the first optical element, can be electrically connected, on the first substrate body surface 3101a, which is on the side of the first substrate surface 10a for disposing the surface light outgoing type light emitting element 1, and further provided with an optical transmission path 12B, which propagates lights being transmitted and received between the surface light outgoing type light emitting element 1, which is electrically connected by the electric circuit wiring patterns 3107 and 3108, and the ferrule 2, which is disposed on the second surface 10b of the substrate adapted for interconnecting optical elements 10, so that, as is the case with the abovementioned first embodiment, there are achieved advantages that the number of components can be reduced leading to miniaturization and low cost, and furthermore a high-efficient and stable optical coupling leading to low power dissipation can be realized, and in addition, the optical transmission path 12B can be provided with the lens 61, so that the optical coupling efficiency between the surface light outgoing type light emitting element 1 and the ferrule 2 can be further enhanced.

Further, in the above mentioned second embodiment, in the same manner as the first embodiment, it is possible to dispose an optical element other than the surface light outgoing type light emitting element 1, for example, the surface incident type light receiving element, on the first surface 10a, and an optical element other than the ferrule 2, for example, the optical fiber 2-2 as a single component, on the second surface 10b, respectively.

[C] Description of the Third Embodiment

FIG. 20 is a schematic diagram illustrating the third embodiment of the present invention, and FIG. 21 is a diagram illustrating the process for manufacturing the substrate 10C adapted for interconnecting optical elements according to the third embodiment of the present invention. The optical module 20C, which is shown in FIG. 20, is provided with a substrate adapted for interconnecting optical elements 10C, which has a configuration different from the substrate adapted for interconnecting optical elements 10 and 10B in the first and second embodiments, respectively. That is, in the substrate adapted for interconnecting optical elements 10C according to the third embodiment, as a optical transmission path integrated with the spacing setting mechanism 11, a lead-through path 12C is formed, which leads through the first surface 10a and second surface 10b of the substrate adapted for interconnecting optical elements 10C. In this case, preferably, the lead-through path 12C is configured to be perpendicular to the light output direction of the surface light outgoing type light emitting element 1 and the light input direction of the ferrule 2.

Further, except for the above mentioned configurations of the substrate, configurations are basically the same as the above mentioned first and second embodiments, so that the same symbols and numerals in FIG. 20, FIG. 21 denotes almost the same portions with those in FIGS. 1 to 7. The surface light outgoing type light emitting element 1 and the ferrule 2 can also be mounted in the same manner as in the case with the above mentioned first and second embodiments.

That is, since the portion, which has been formed as a recess to avoid the contact of the light-emitting component 1a of the surface light outgoing type light emitting element 1 with the surface of the substrate, is formed as a hole, which leads through up to the second surface 10b, the lead-through path 12C has functions of the above mentioned space setting mechanism and that of the optical transmission path, concurrently.

The above-mentioned substrate adapted for interconnecting optical elements 10C can be prepared, for example, as shown in FIG. 21. That is, after the formation processes up to the protection layer 3110 are completed by the same process as the above mentioned ones in FIGS. 2 to 6, by forming a lead-through path 12C by $CO_2$ laser and the like at the location where optical signal leads through, there is completed the substrate adapted for interconnecting optical elements 10C, having the lead-through path 12C as a transmission hole for optical signal. And yet, it is made possible to form the lead-through path 12C by an external processing such as punching.

Additionally, by making the diameter of the lead-through path 12C relatively larger, the positioning with alignment between the surface light outgoing type light emitting element 1 and the substrate adapted for interconnecting optical elements 10C can easily be performed. That is, in case of mounting the surface light outgoing type light emitting element 1 onto the substrate adapted for interconnecting optical elements 10C, the provision that the adsorption tool 72 (refer to FIG. 8) is made of a transparent material, in the state that the substrate adapted for interconnecting optical elements 10C is attached to the adsorption tool 72, allows the light-emitting component 1a of the surface light outgoing type light emitting element 1 to be visually confirmed through the lead-through path 12C of the substrate adapted for interconnecting optical elements 10 from the side of the adsorption tool 72. Thus, the alignment between the surface light outgoing type light emitting element 1 and the substrate adapted for interconnecting optical elements 10C can be accurately and securely carried out only by the visual confirmation.

Moreover, since the thickness of the portion of the lead-through path 12C in the substrate adapted for interconnecting optical elements 10C, which is configured in this way, that is, the thickness of the portion of the flexible wiring sheet, where the surface light outgoing type light emitting element is mounted (where the circuit pattern on the surface side is exposed) can be for example, approximately 39 μm, the optical path length between the surface light outgoing type light emitting element 1 and the ferrule, which are mounted on the first surface 10a and the second surface 10b, respectively, can also be on the order of 39 μm.

Thus, in the third embodiment of the present invention, the substrate adapted for interconnecting optical elements 10C is provided with the electric circuit wiring patterns 3107 and 3108, to which the surface light outgoing type light emitting element 1 can be electrically connected, on the first substrate body surface 3101a of the polyimide film 3101, and further is provided with a lead-through path 12C, which propagates lights being transmitted and received between the surface light outgoing type light emitting element 1, which is electrically connected by the electric circuit wiring patterns 3107 and 3108, and the ferrule 2, which is disposed on the second surface 10b of the substrate adapted for interconnecting optical elements 10, so that, as is the case with the above mentioned first embodiment, there are achieved advantages that the number of components can be reduced leading to miniaturization and low cost, and furthermore a high-efficient and stable optical coupling leading to low power dissipation can be accomplished and in addition, a simplification of configuration of the substrate can be obtained.

Further, as well in the above mentioned third embodiment, in the same manner as in the first embodiment, it is possible to dispose an optical element other than the surface light outgoing type light emitting element 1, for example, the surface incident type light receiving element, on the first surface 10a, and an optical element other than the ferrule 2, for example, the optical fiber 2-2 as a single component, on the second surface 10b, respectively.

Furthermore, by filling a material, whose refractive index is matched with the above mentioned first or second optical element, into the lead-through path 12C of the substrate adapted for interconnecting optical elements 10D according to the above mentioned third embodiment, the substrate adapted for interconnecting optical elements 10D having the optical transmission path 12D can be made as shown in FIG. 22. Thus, there can be prevented the lowering of the optical coupling efficiency between optical elements due to the reflection of light propagating in the optical transmission path 12D as well as any adverse influence on transmission characteristics.

As shown in FIG. 20, in the optical module 20, which is configured as the transmission module, the material whose refractive index is equal to that of the optical fiber 2-2 of the ferrule 2, for example, an optical bond 51, whose refractive index is equal to that of the optical fiber 2-2 of the ferrule 2, is filled into the lead-through path 12C. Further, as well in case of configuration as the transmission module, the material whose refractive index is matched with the refractive index of the optical fiber 2-2, as a light transmission element, is filled.

Furthermore, the above mentioned optical bond 51 has the function of the optical bond 85 to fix the ferrule 2 and the substrate adapted for interconnecting optical elements 10D, and concurrently has the function of the member to fix the surface light outgoing type light emitting element 1 and the substrate adapted for interconnecting optical elements 10D.

That is, on the adsorption table 81 shown in FIG. 10, there are disposed the surface light outgoing type light emitting element 1 and the substrate adapted for interconnecting optical elements 10C according to the third embodiment, and the optical bond 51 (the symbol 85 in FIG. 10) having characteristics that the refractive index is equal to that of the optical fiber 2-2 in the ferrule 2, is applied onto a predetermined location on the substrate adapted for interconnecting optical elements. Then, through the lead-through path 12C, the optical bond 51 flows also into the light-emitting component 1a of the surface light outgoing type light emitting element 1, therefore, by the optical bond 51, the surface light outgoing type light emitting element 1 and the substrate adapted for interconnecting optical elements 10D can be fixed. Moreover, since the electric terminal portion and electric wiring layers 3107 and 3108 of the surface light outgoing type light emitting element 1 are in contact, it is possible to electrically connect only by this contact without the solder bump 3109 being interposed.

Additionally, the optical bond 51 to be filled in the lead-through path 12C is made to be in contact with the light-emitting component 1a, however, preferably by using a softer material, or the one having relatively smaller Young's modulus, whereby the deterioration of the light-emitting component 1 is to be prevented.

[D] Others

According to the present invention, in addition to the above-mentioned embodiments, various modifications or variations can be implemented without departing from the spirit of the invention.

And, by the above mentioned embodiments, it is made possible to manufacture an apparatus according to the present invention.

What is claimed is:

1. A substrate comprising a substrate body adapted for interconnecting optical elements, wherein the substrate body is comprised of:

an electrical wiring layer disposed on a first substrate body surface in such a manner as to be capable of electrically connecting a first optical element mounted above the side of the first substrate body surface; and an optical transmission path, which propagates lights being transmitted and received between said first optical element and a second optical element which is disposed on the side of a second substrate body surface, wherein the substrate body is a flexible wiring sheet, and wherein the optical transmission path is constituted by a lead-through path, which leads through said first substrate body surface and said second substrate body surface;

wherein said first surface of the substrate body in said substrate body is set to be the surface defined in the width direction and length direction of said substrate body, while the second substrate body surface in said substrate body is configured as the back surface of said first substrate body surface in said substrate body, and further said optical transmission path is configured in such a manner as to provide a communication or connection between said first and second substrate body surfaces in the thickness direction of said substrate body, and wherein in the case where said first optical element is arranged such that an optical component disposed at said first optical element faces the first substrate body surface, there is provided a spacing setting mechanism for providing a spacing between said optical component and the substrate body.

2. The substrate adapted for interconnecting optical elements according to claim 1, wherein at said first substrate body surface of the substrate body, there are provided a first area, where the electrical wiring layer is formed, and a second area, which is surrounded by said electric wiring layer, without the electric wiring layer being formed, and said spacing setting mechanism is constituted by the recess being formed of the first area surrounding the second area along with the second area.

3. A substrate adapted for interconnecting optical elements, comprising:

an electrical wiring layer disposed on a first substrate body surface in such a manner as to be capable of electrically connecting a first optical element mounted on the side of the first substrate body surface; and an optical transmission path, which propagates lights being transmitted and received between said first optical element and a second optical element which is disposed on the side of a second substrate body surface;

wherein the optical transmission path is constituted by a lead-through path, which leads through said first substrate body surface and said second substrate body surface; and wherein the lead-through path is filled with light transmissive material, whose refractive index is matched with that of said first or second optical element.

4. A substrate comprising a substrate body adapted for interconnecting optical elements, wherein the substrate body is comprised of:

an electrical wiring layer disposed on a first substrate body surface in such a manner as to be capable of electrically connecting a first optical element mounted above the side of the first substrate body surface; and an optical transmission path, which propagates lights being transmitted and received between said first optical element and a second optical element which is disposed on the side of a second substrate body surface, wherein the substrate body is a flexible wiring sheet, and wherein the optical transmission path is constituted by a lead-through path, which leads through said first substrate body surface and said second substrate body surface;

wherein the substrate body is formed of a light transmissive material, and wherein the optical transmission path includes a lens, which has been formed on the substrate body facing the optical component of said first or second optical element.

5. The substrate adapted for interconnecting optical elements according to claim 4, wherein an antireflection coating is formed on the surface of the lens.

6. An optical module comprising:

a substrate;

a first optical element having an optical component which emits light or on which light is made incident, and being disposed such that said optical component faces a first substrate face side in the substrate, and a second optical element disposed on a second substrate face side in the substrate; the substrate comprising a substrate body, wherein the substrate is comprised of:

an electrical wiring layer, disposed on a first substrate body surface, in such a manner as to be capable of electrically connecting a first optical element mounted on the side of said first substrate body surface; and an optical transmission path, which propagates lights being transmitted and received between said first optical element which is electrically connected at said electrical wiring layer, and a second optical element disposed on the side of a second substrate body surface, which is different from said first substrate body surface in said substrate body, wherein the substrate body is a flexible wiring sheet, and wherein the optical transmission path is constituted by a lead-through path, which leads through said first substrate surface and said second substrate surface.

7. The optical module according to claim 6, wherein said first substrate body surface in said substrate body is set to be the surface defined in the width direction and length direction of said substrate body, while said second surface of the substrate body in said substrate body is configured as the back surface of said first surface of the substrate body in said substrate body, and further the optical transmission path is configured in such a manner as to provide a communication or connection between said first and second substrate body surfaces in the thickness direction of said substrate body.

8. The optical module according to claim 6, wherein at said first substrate body surface of the substrate body, there are provided a first area, where the electric wiring layer is formed, and a second area, which is surrounded by said electrical wiring layer, without the electrical wiring layer being formed, and on the second region the first optical element is disposed.

9. The optical module according to claim 8, wherein by the recess being formed of the first area surrounding the second area along with the second area there is constituted a spacing setting mechanism for providing spacing between said optical component and the substrate body.

10. An optical module, comprising:
   a substrate;
   a first optical element having an optical component which emits light or on which light is made incident, and being disposed such that said optical component faces a first substrate face side in the substrate, and
   a second optical element disposed on a second substrate face side in the substrate; the substrate comprising a substrate body,
   wherein the substrate is comprised of:
   an electrical wiring layer, disposed on a first substrate body surface, in such a manner as to be capable of electrically connecting a first optical element mounted on the side of said first substrate body surface; and
   an optical transmission path, which propagates lights being transmitted and received between said first optical element which is electrically connected at said electrical wiring layer, and a second optical element disposed on the side of a second substrate body surface, which is different from said first substrate body surface in said substrate body;
   wherein the optical transmission path is constituted by a lead-through path, which leads through said first substrate surface and said second substrate surface; and
   wherein the lead-through path is filled with light transmissive material, whose refractive index is matched with that of said first or second optical element.

11. The optical module according to claim 10, wherein said substrate body is formed of a light transmissive material.

12. The optical module according to claim 10, wherein the optical transmission path includes a lens, which has been formed on the substrate body facing the optical component of said first or second optical element.

13. The optical module according to claim 12, wherein an antireflection coating is formed on the surface of the lens.

14. The optical module according to claim 6, wherein said second optical element is an optical transmission element enabling optical transmission.

15. The optical module according to claim 14, wherein said optical transmission element is an optical fiber or a ferrule, in which the optical fiber is built-in.

16. The optical module according to claim 6, wherein said first optical element is a surface light outgoing type light emitting element.

17. The optical module according to claim 6, wherein said first optical element is a surface light incident type light receiving element.

18. An optical unit comprising:
   a substrate having first and second faces opposed to each other;
   a first optical element mounted on the first face of said substrate; and
   a second optical element disposed in the second face side of said substrate;
   wherein said substrate further comprises a light transmissive path being constituted by a lead-through path, which leads through said first and second faces of said substrate, and either a lens or a member of a predetermined refractive index which is inserted in said through hole.

* * * * *